US012613112B2

(12) United States Patent
Müller et al.

(10) Patent No.: US 12,613,112 B2
(45) Date of Patent: Apr. 28, 2026

(54) METHOD AND DEVICE FOR MONITORING THE TRACK SIGNALS OF A POSITION CHANGE SENSOR

(71) Applicant: SEW-EURODRIVE GMBH & CO. KG, Bruchsal (DE)

(72) Inventors: Michael Müller, Karlsdorf-Neuthard (DE); Florian Zerfass, Vaihingen an der Enz (DE); Benjamin Norenburg, Karisdorf-Neuthard (DE); Christian Senft, Karlstuhe-Grünwettersbach (DE); Sebastian Richter, Heidelberg (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 1127 days.

(21) Appl. No.: 16/483,323

(22) PCT Filed: Jan. 23, 2018

(86) PCT No.: PCT/EP2018/025017
§ 371 (c)(1),
(2) Date: Aug. 2, 2019

(87) PCT Pub. No.: WO2018/141482
PCT Pub. Date: Aug. 9, 2018

(65) Prior Publication Data
US 2020/0011710 A1 Jan. 9, 2020

(30) Foreign Application Priority Data
Feb. 2, 2017 (DE) ..................... 10 2017 000 931.7

(51) Int. Cl.
*G01D 5/244* (2006.01)
*G01D 5/347* (2006.01)

(52) U.S. Cl.
CPC ......... *G01D 5/24457* (2013.01); *G01D 5/347* (2013.01)

(58) Field of Classification Search
CPC .. G01D 5/244; G01D 5/24457; G01D 5/2457; G01D 5/485; G01D 3/08;
(Continued)

(56) References Cited

U.S. PATENT DOCUMENTS 5,065,324 A * 11/1991 Oshita .................... B62D 15/02
701/41
5,072,181 A * 12/1991 Burger ............... G01D 5/34738
324/207.2
(Continued)

FOREIGN PATENT DOCUMENTS

CN 102422127 A 4/2012
DE 3631429 A1 3/1988
(Continued)

OTHER PUBLICATIONS

Machine Translation of DE 3631429 (Year: 1988).*
(Continued)

*Primary Examiner* — Steven L Yeninas
(74) *Attorney, Agent, or Firm* — Carter, DeLuca & Farrell LLP

(57) ABSTRACT

In a method and device for monitoring the track signals of a position change sensor, a resource-optimized diagnosis of errors of track signals of a position change sensor is performed.

23 Claims, 5 Drawing Sheets

(58) Field of Classification Search
CPC .......... G01D 5/24461; G01D 5/24466; G01D
5/2451; G01D 5/2454; G01D 5/2455
See application file for complete search history.

(56) References Cited

U.S. PATENT DOCUMENTS

| | | | | |
|---|---|---|---|---|
| 5,900,930 | A * | 5/1999 | Simon | G01D 5/3473 |
| | | | | 356/138 |
| 6,434,516 | B1 | 8/2002 | Topmiller | |
| 6,670,804 | B1 * | 12/2003 | Glemser | B62D 15/02 |
| | | | | 324/207.16 |
| 7,062,405 | B2 | 6/2006 | Voelkel | |
| 7,847,704 | B2 | 12/2010 | Wagner et al. | |
| 8,917,088 | B2 | 12/2014 | Labiste | |
| 9,766,097 | B2 | 9/2017 | Joachimsthaler et al. | |
| 2004/0133387 | A1 * | 7/2004 | Volkel | G05B 21/02 |
| | | | | 702/177 |
| 2005/0252272 | A1 * | 11/2005 | Otsuka | G01D 5/24457 |
| | | | | 73/1.01 |
| 2009/0015423 | A1 * | 1/2009 | Wagner | G03G 15/50 |
| | | | | 340/679 |
| 2010/0097088 | A1 * | 4/2010 | Uemura | G01D 5/24461 |
| | | | | 324/750.3 |
| 2010/0158082 | A1 * | 6/2010 | Galinski | G01D 5/24461 |
| | | | | 375/216 |
| 2010/0201373 | A1 * | 8/2010 | Sato | G01D 5/24461 |
| | | | | 324/537 |
| 2012/0136625 | A1 * | 5/2012 | Joachimsthaler | G01D 5/2457 |
| | | | | 702/150 |
| 2015/0168349 | A1 * | 6/2015 | Reusing | G01D 5/2258 |
| | | | | 324/207.17 |
| 2016/0167701 | A1 * | 6/2016 | Sone | B62D 5/0463 |
| | | | | 701/43 |
| 2018/0073895 | A1 * | 3/2018 | Chellamuthu | G01D 5/2073 |
| 2019/0086241 | A1 * | 3/2019 | Joachimsthaler | G01D 5/24476 |
| 2020/0182656 | A1 * | 6/2020 | Poley | H03M 1/66 |

FOREIGN PATENT DOCUMENTS

| | | | |
|---|---|---|---|
| DE | 10036090 | A1 | 2/2002 |
| DE | 10208915 | A1 | 7/2003 |
| DE | 102007033009 | A1 | 1/2009 |
| DE | 102010051873 | A1 | 5/2012 |
| DE | 102011083042 | A1 | 5/2012 |
| EP | 0432401 | A2 | 6/1991 |
| EP | 1302753 | A1 | 4/2003 |
| WO | WO 2003007099 | A1 | 1/2003 |
| WO | WO 2006092026 | A1 | 9/2006 |

OTHER PUBLICATIONS

International Preliminary Report on Patentability issued in International Patent Application No. PCT/EP2018/025017, dated Aug. 15, 2019 (12 pages).
International Search Report issued Jun. 8, 2018, in International Application No. PCT/EP2018/025017 (English-language translation).

* cited by examiner

METHOD AND DEVICE FOR MONITORING THE TRACK SIGNALS OF A POSITION CHANGE SENSOR

FIELD OF THE INVENTION

The present invention relates to a method and a device for monitoring the track signals of a position change sensor.

BACKGROUND INFORMATION

Position change sensors, such as angular position sensors, are described in German Published Patent Application No. 10 2007 033 009.

A length or angle measuring system having an error detection device is described in German Published Patent Application No. 36 31 429.

A monitoring unit and method for monitoring position signals of incremental position measuring devices is described in German Published Patent Application No. 10 2011 083 042.

A signal processor is described in PCT Patent Publication No. WO 2006/092026.

A position sensor monitoring method is described in European Published Patent Application No. 1 302 753.

An integrated circuit arrangement and method for signal monitoring is described in German Published Patent Application No. 10 2010 051 873.

SUMMARY

Example embodiments of the present invention provide for resource-intensive error diagnosis for implementing complete detection of track signal errors in position change sensors. According to an example embodiment of the present invention, the task of a position change sensor is to measure changes in position or angle of a moving system part and convert this information to electrical signals, so that with the aid of these signals, a control and/or regulating system may control, in a targeted manner, further actuators connected indirectly or directly to this system part, in particular, a drive unit that includes an electric motor and a brake.

These electrical signals of the position change sensor are typically generated by an optical or magnetic method, in that two sensors are positioned so that a scale that includes alternating bright and dark spots, or changing magnetic flux densities, is scanned in such a manner, that the one sensor always measures an extremum, while at the same time, the other sensor detects the zero crossing. This produces two continuous, sinusoidal signals, the analog track signals A and B, which are 90° out of phase.

If track signal A leads track signal B in time, then a movement in one direction is taking place. If track signal A trails track signal B in time, then a movement in the opposite direction is taking place. Thus, an information item regarding direction may be derived in light of the two track signals A and B. If, in the case of rotated position change sensors, the number of marks per revolution are known, or, in the case of linear measuring devices, the distance between two marks, i.e., the scale, is known, then the change in position, the speed and the acceleration may additionally be calculated. With knowledge of a particular reference position, which is ascertained, for example, using a reference execution of the system, the change in position relative to this reference position, and thus, the exact, current position, as well, may be determined.

For simple position measuring applications, sinusoidal track signals A and B are typically converted to digital square-wave signals by Schmitt triggers. In this context, the digitization takes place either directly in the position change sensor or in the control and/or regulating system. If the digitization takes place in the position change sensor, then the digital square-wave signals are transmitted with TTL or HTL levels to the control and/or regulating system. In the case of digitization in the control and/or regulating system, the transmission by the position change sensor takes place via sinusoidal track signals A and B. The change in position or angle of a moving system part may be calculated from the time characteristic of these digital square-wave signals, with a certain amount of inaccuracy due to the digitization. The digitized track signals are adequate for common applications, such as ascertaining an angular motion. However, this method is overly inaccurate for detecting very slow movements and is only possible, using an estimate of the change in motion and appropriate interpolation.

For position measuring applications, which require a higher accuracy, the transmission to the control and/or regulating system always occurs via analog track signals A and B. In addition to the digitization, sampling of the analog track signals by an analog-to-digital converter at a high resolution, typically, at at least 10 bits, mostly takes place in the control and/or regulating system, in order to keep the quantization error small. In this context, the analog signal levels digitally determined are used to ascertain the exact position within a period of the sinusoidal track signals. Thus, changes in linear motion or angle may be measured highly accurately, using a combination of analog and digital track signal evaluation. Alternatively, the track signal evaluation may also be integrated directly in the position change sensor. In this case, the measured changes in linear motion and angle are transmitted to the control and regulating system, using a digital data protocol, typically, via an industrial field bus, such as Profibus.

The measured changes in linear motion and/or angle are used, for example, in order to move tool heads of machine tools, industrial robots and/or mobile assistance systems. In this case, a defective position change sensor mostly leads to the destruction of the workpiece and/or the machine, due to the incorrect regulation resulting from it. In the worst case, the operator of the machine may be injured or even killed. In this context, occurring errors may have various effects. Thus, an electrical defect, such as removal of the measuring standard or a short circuit on the connection lead, may result in interference of the analog track signals. A loss of the mechanical coupling between the motor and position change sensor results in output signals, which do not correspond to the actual motion and, in the most unfavorable case, even indicate stoppage, although a movement is still taking place.

In the following, only the cases of errors, which have an effect on the analog track signals, are considered in more detail, since these may be detected by a suitable evaluation circuit in the control and/or regulating system. Further cases of errors must be controlled through error exclusion, for example, by mechanical overdimensioning and form locking, or by superordinate measures, mostly using the control method. In this context, the characteristic, that the sinusoidal track signals 90° out of phase describe a circle, is used for the evaluation of the analog track signals. The radius R of this circle must always be within a valid range of values and may be calculated, in each instance, from two simultaneously recorded, signal level values ($U_A$, $U_B$) of the track signals, using the Pythagorean trigonometric identity $$U_A^2 + U_B^2 = \left(\hat{U}_A * \sin(2\pi * f * t)\right)^2 + \left(\hat{U}_B * \cos(2\pi * f * t)\right)^2 = R^2,$$

where f is a track signal frequency at time t. In this context, if ascertained radius R is outside of the permissible tolerance, then the further evaluation unit signals an error. In order that no erroneous signals lie within the permissible tolerance range for a large portion of the signal period, a signal period is sampled at least 5 times. Consequently, every error in the position change sensor and on the track signals is detectable. Thus, a large need of the evaluating microcontroller for resources and, therefore, overly high material costs of the evaluation circuit, are prevented.

In the method for monitoring the track signals of a position change sensor, in particular, with the aid of an encoder signal diagnostic device, the track signals of the position change sensor are sampled cyclically in a chronological sequence, in particular, succession, of sampling times, and the sampling values determined in this manner are evaluated; the sequence including time periods; each time period including more than four sampling times set apart temporally from each other at regular intervals, and, in this context, each time period being assigned a respective temporal spacing ($T_1$, $T_2$, $T_3$, $T_4$, $T_5$); in particular, each of the time periods being assigned a respective spacing bijectively.

In this instance, the advantage is that a further frequency range may be evaluated, using as few samplings as possible, and at as high a resolution as possible.

According to example embodiments, the temporal spacing assigned to one of the time periods is less than the temporal spacing assigned to another time period situated later within the sequence; in particular, the temporal spacing assigned to a time period of the sequence directly following a preceding time period of the sequence being twice as large as the temporal spacing assigned to the preceding time period. In this instance, the advantage is that the base patterns are positioned so as to be superimposed on each other, and consequently, respective frequencies may be measured at a high resolution in a time-saving manner.

According to example embodiments, the spacing assigned to a, in particular, the first, time period of the sequence, corresponds to a fifth of the period length of the maximum allowable frequency of the output signals of the position change sensor, in particular, signal frequency $f_{MAX}$, or less, and/or the spacing assigned to a, in particular, to the last, time period of the sequence corresponds to a fifth of the period length of a limiting signal frequency $f_G$, or less. In this context, the advantage is that the entire frequency range may be evaluated without any gaps or with few gaps.

According to example embodiments, the track signals are also evaluated on the basis of digital signal parameters, for example, on the basis of trailing and/or leading switching edges, and the result of this evaluation is combined with the evaluation of the sampling values, in particular, in such a manner, that the track signals up to a maximum signal frequency $f_{MAX}$ are diagnosed completely for errors. In this context, the advantage is that errors may be diagnosed in an improved manner.

According to example embodiments, the sequence is generated in advance, in particular, during production or initial operation, and stored in a lookup table unit. In this case, the advantage is that a particularly simple method is implementable, and only a small amount of computing time is necessary.

In the case of the device, in particular, for implementing a method mentioned above, in particular, for diagnosing errors of track signals of a position change sensor (6), in particular, of an incremental encoder, the device includes:
a first evaluation unit;
a further evaluation unit;
and a logic operations unit;
the first evaluation unit evaluating the track signals on the basis of digital signal parameters, for example, on the basis of trailing and/or leading switching edges; at least one status information item, in particular a speed information item and/or a position information item and/or a direction of movement information item and/or an acceleration information item and/or a feedback information item, being computed from the digital signal parameters and made available at a first output of the first evaluation unit; in response to the identification of an error condition of the digital signal parameters, an error signal being generated at a further output of the first evaluation unit; the further evaluation unit evaluating the track signals on the basis of analog signal parameters, typically, on the basis of voltage levels and/or current levels; in response to departure from a valid range of the analog signal parameters, an error signal being generated at the output of the further evaluation unit; by performing a logic operation, the logic operations unit generating a resulting error signal at the output of the logic operations unit as a function of the computed status information item, the state of the error signal of the first evaluation unit, and the state of the error signal of the further evaluation unit; at least the resulting error signal of the logic operations unit being transmitted to a first output of the encoder signal diagnostic device; and the resulting error signal indicating if the track signals of the position change sensor are erroneous.

In this connection, the advantage is that a suitable combination of both digital and analog signal parameters produces an optimized error diagnosis.

Thus, according to example embodiments of the present invention, the problem of resource-intensive error diagnosis for achieving complete exposure of track signal errors in position change sensors is solved by carrying out the diagnostic evaluation in a manner adapted to a maximum occurring track signal frequency, with the aid of both digital signal parameters and analog signal parameters; by suitably combining the two types of signal parameters, the number of measuring times needed being able to be reduced in such a manner, that consequently, costs, in particular, component and/or manufacturing costs, may be reduced.

According to example embodiments, the status information item of the first evaluation unit is transmitted to another output of the encoder signal diagnostic device. The advantage of this is that these status information items may also be used for further control and/or regulating tasks and, in this context, must only be calculated once.

According to example embodiments, the first evaluation unit includes:
a Schmitt trigger unit;
a quadrature decoder;
an edge counter;
a status information computation unit;
and a comparator unit;
the Schmitt trigger unit converting the track signals of the position change sensor to square-wave signals; the quadrature decoder generating a direction-dependent edge count value from the square-wave signals; the edge counter generating a direction-independent edge count value from the square-wave signals; the status information computation unit computing a status information item from the direction-dependent edge count value and supplying it to a first output of the first evaluation unit; and the comparator unit checking the direction-dependent edge count value and the direction-independent edge count value for equality and, in the event of inequality, sets an error signal at a further output of the first evaluation unit. The advantage of this is that two standard diagnostic methods, which are established and simple to implement, may be utilized.

According to example embodiments, further evaluation unit 3 includes:

> a timing generator unit;
> a lookup table unit;
> an analog-to-digital converter unit;
> and a trigonometric unit;

the timing generator unit generating synchronization signals cyclically in variable intervals, as a function of the data from a lookup table unit; the analog-to-digital converter unit converting the current analog level of the track signals of the position change sensor to equivalent digital pairs of values $(U_A, U_B)$ as a function of this synchronization signal; and the trigonometric unit checking the digital pairs of values $(U_A, U_B)$ of the track signals for validity, using the equation:

$$U_A^2 + U_B^2 = \left(\hat{U}_A * \sin(2\pi * f * t)\right)^2 + \left(\hat{U}_B * \cos(2\pi * f * t)\right)^2 = R^2,$$

and, upon departure from a defined tolerance range of values, sets an error signal at the output of the further evaluation unit. In this case, the advantage is that the signal evaluation is rapidly adaptable to the specific application via a change in the values in the lookup table unit.

According to example embodiments, logic operations unit 4 includes:

> a switch element;
> and a logic unit;

the switch element transmitting or not transmitting the error signal of the first evaluation unit at its output as a function of the status information item of the first evaluation unit; and the logic unit setting an error signal at the output of the logic operations unit, as soon as the error signal of the first evaluation unit transmitted by the switch element and/or the error signal of the further evaluation unit is applied. In this connection, the advantage is that the results of different evaluation units are combinable.

In the system that includes a frequency converter, position change sensor and encoder signal diagnostic device, the encoder signal diagnostic device is integrated in a frequency converter; on the input side, the encoder signal diagnostic device being connectable to a position change sensor having an analog output stage; and on the output side, the encoder signal diagnostic device being connectable to the regulating portion of the signal electronics of the frequency converter.

In this case, the advantage is that a position change sensor is easily implemented, since the more complex electronics for the error diagnosis is integrated in the frequency converter.

In the case of the system that includes a frequency converter, position change sensor and encoder signal diagnostic device, the encoder signal diagnostic device is constructed so as to be integrated directly in a position change sensor; on the input side, the encoder signal diagnostic device being connectable to the analog output stage of the position change sensor; the analog track signals being generated and/or conditioned in the analog output stage of the position change sensor; on the output side, the encoder signal diagnostic device being connectable by a converter to a serial communications interface; the position change sensor being connectable to a frequency converter via a serial communications interface; and at least the track signals and/or the status information item of the output of the first evaluation unit and the resulting error signal of the output of the logic operations unit being able to be transmitted by a further converter to the regulating portion of the signal electronics of the frequency converter, via this serial communications interface.

In this connection, the advantage is that digitization of the status and error information may already be carried out in the position change sensor, and therefore, it is possible to transmit the data without interference to the frequency converter.

In the system that includes a frequency converter, position change sensor and encoder signal diagnostic device, the track signals of a position change sensor are completely diagnosable for errors up to a maximum signal frequency $f_{MAX}$; the first evaluation unit evaluating track signals in the entire frequency range up to a maximum signal frequency $f_{MAX}$; the further evaluation unit evaluating track signals less than or equal to limiting signal frequency $f_G$ in such a manner, that within a measuring cycle $T_{CYCLE}$, each signal period is sampled N times, in particular, 5 times, and track signals between limiting frequency $f_G$ and maximum signal frequency $f_{MAX}$ are evaluated in such a manner, that within a measuring cycle $T_{CYCLE}$, a signal period is sampled at least N times, in particular, at least 5 times; for track signals less than or equal to limiting signal frequency $f_G$, the logic operations unit only transmitting the error signal of the second evaluation unit to its output; and for track signals greater than limiting signal frequency $f_G$, the logic operations unit setting the error signal at the output, if either the error signal of the first evaluating unit or the error signal of the second evaluating unit is set.

In this case, the advantage is that the results of the two evaluating units are combined optimally as a function of the status information item.

In the system that includes a frequency converter, position change sensor and encoder signal diagnostic device, the measuring times are generated in advance and stored in a lookup table unit; the first measuring interval being selected in such a manner, that a period of limiting signal frequency $f_G$ is sampled N times, in particular, at least 5 times; at the first measuring interval, the track signals of the position change sensor being sampled continuously over measuring cycle $T_{CYCLE}$; a further measuring interval $T_n$ being half the duration of previous measuring interval $T_{n-1}$; a further measuring interval $T_n$ being generated until maximum signal frequency $f_{MAX}$ is sampled N times, in particular, at least 5 times; at each further measuring interval $T_n$, the track signals only being sampled at the beginning of each measuring cycle $T_{CYCLE}$ for M, in particular, 9 measuring times; and simultaneous measuring times of different measuring intervals being combined to form one measuring time.

In this connection, the advantage is that the number of necessary measuring times may be reduced.

Further features and aspects of example embodiments of the present invention are described in further detail below with reference to the appended Figures.

DETAILED DESCRIPTION

Figure 1:
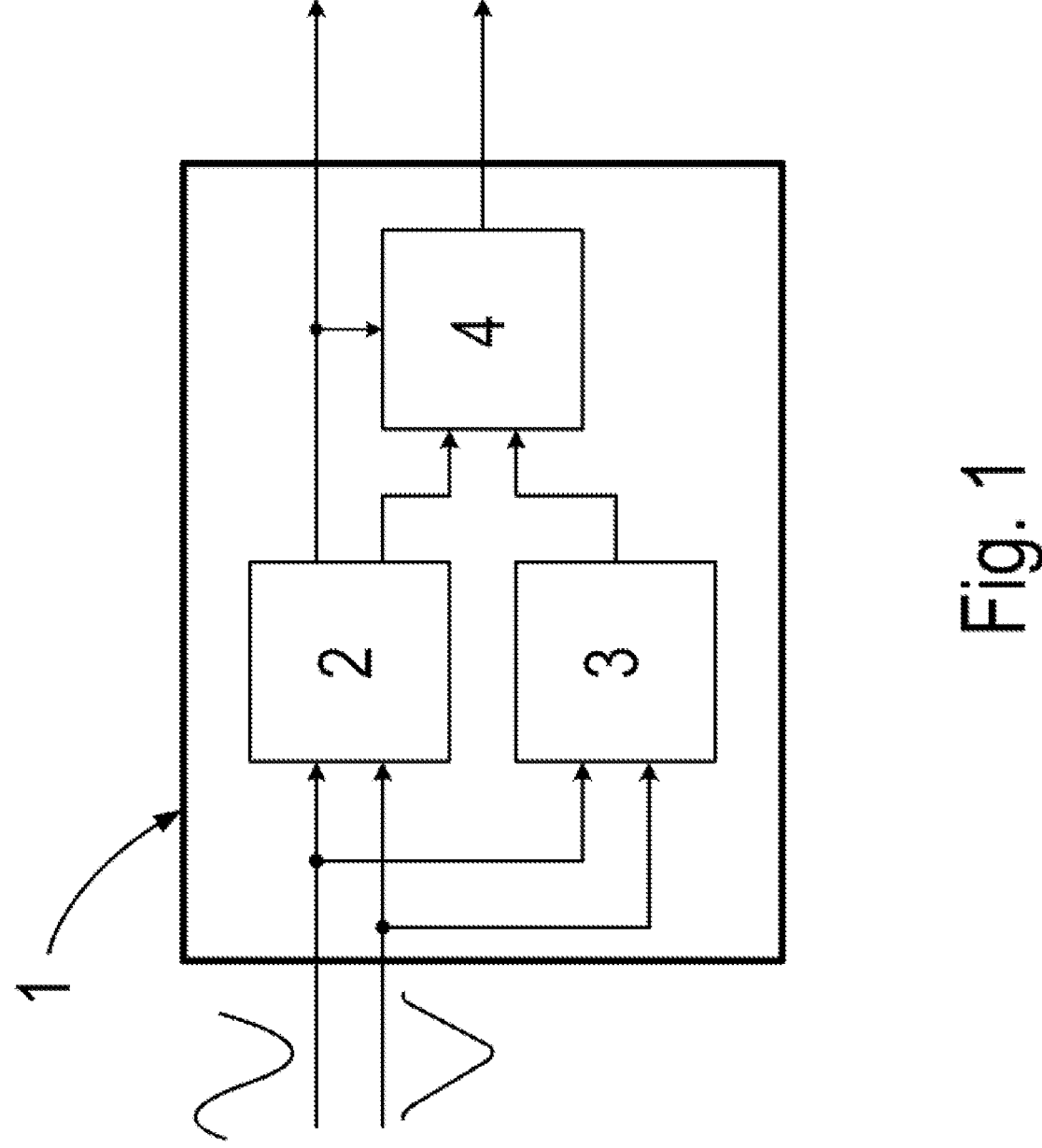
FIG. 1 schematically illustrates an encoder signal diagnostic device.

An encoder signal diagnostic device 1 is schematically illustrated in FIG. 1.

Figure 2:
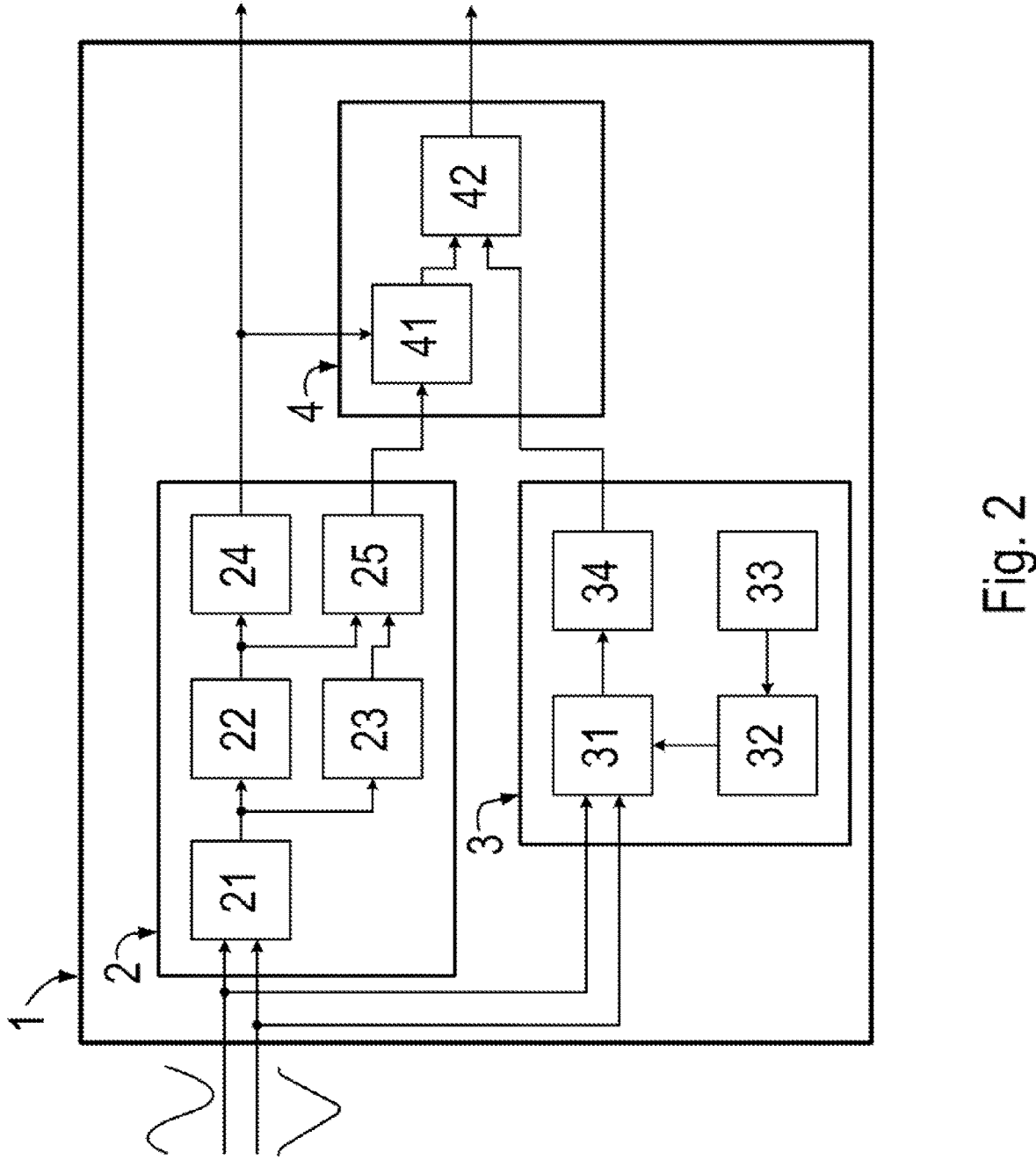
FIG. 2 schematically illustrates an encoder signal diagnostic device.

An exemplary implementation of the encoder signal diagnostic device 1 according to an example embodiment of the present invention, including a first evaluation unit 2, a further evaluation unit 3 and a logic operations unit 4, is illustrated in FIG. 2.

Figure 3:
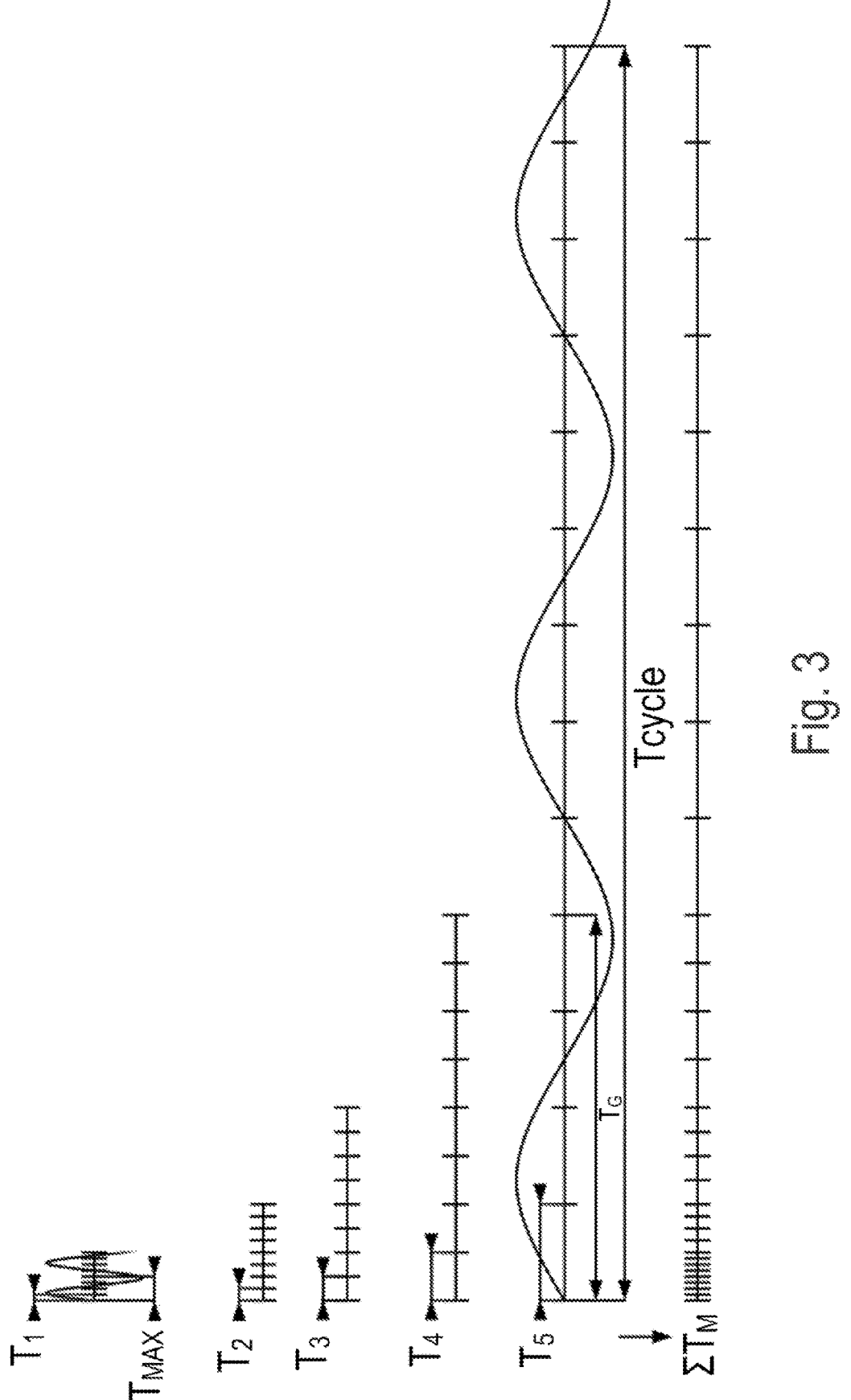
FIG. 3 schematically illustrates the generation of measuring times for an evaluation unit.

The generation of the measuring times for the further evaluation unit 3 in accordance with an example embodiment of the present invention is described in FIG. 3.

Figure 4:
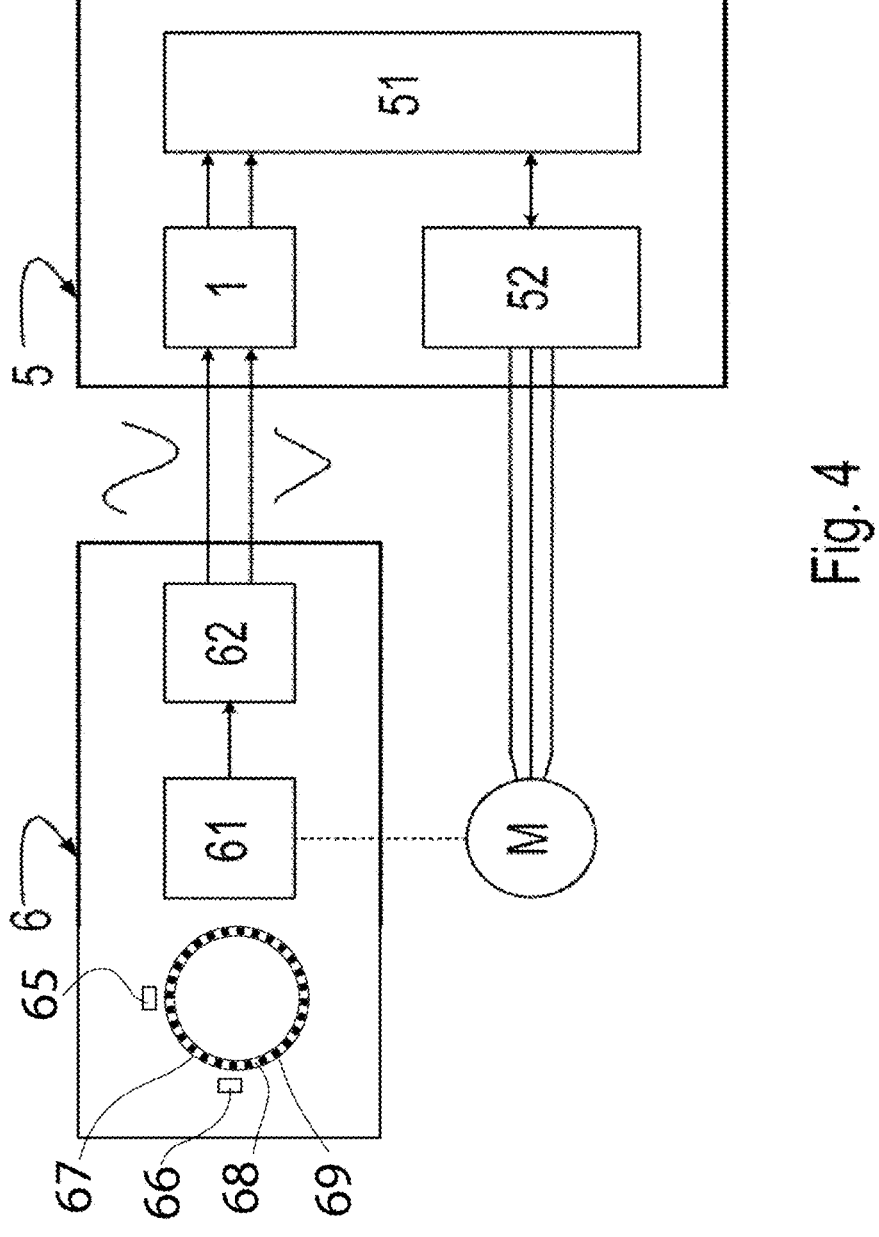
FIG. 4 schematically illustrates an implementation of an encoder signal diagnostic device.

An example of an implementation of an encoder signal diagnostic device 1 according to an example embodiment of the present invention, in which the encoder signal diagnostic device 1 is constructed so as to be integrated in a frequency converter 5 of an electric power drive system, is schematically illustrated in FIG. 4.

Figure 5:
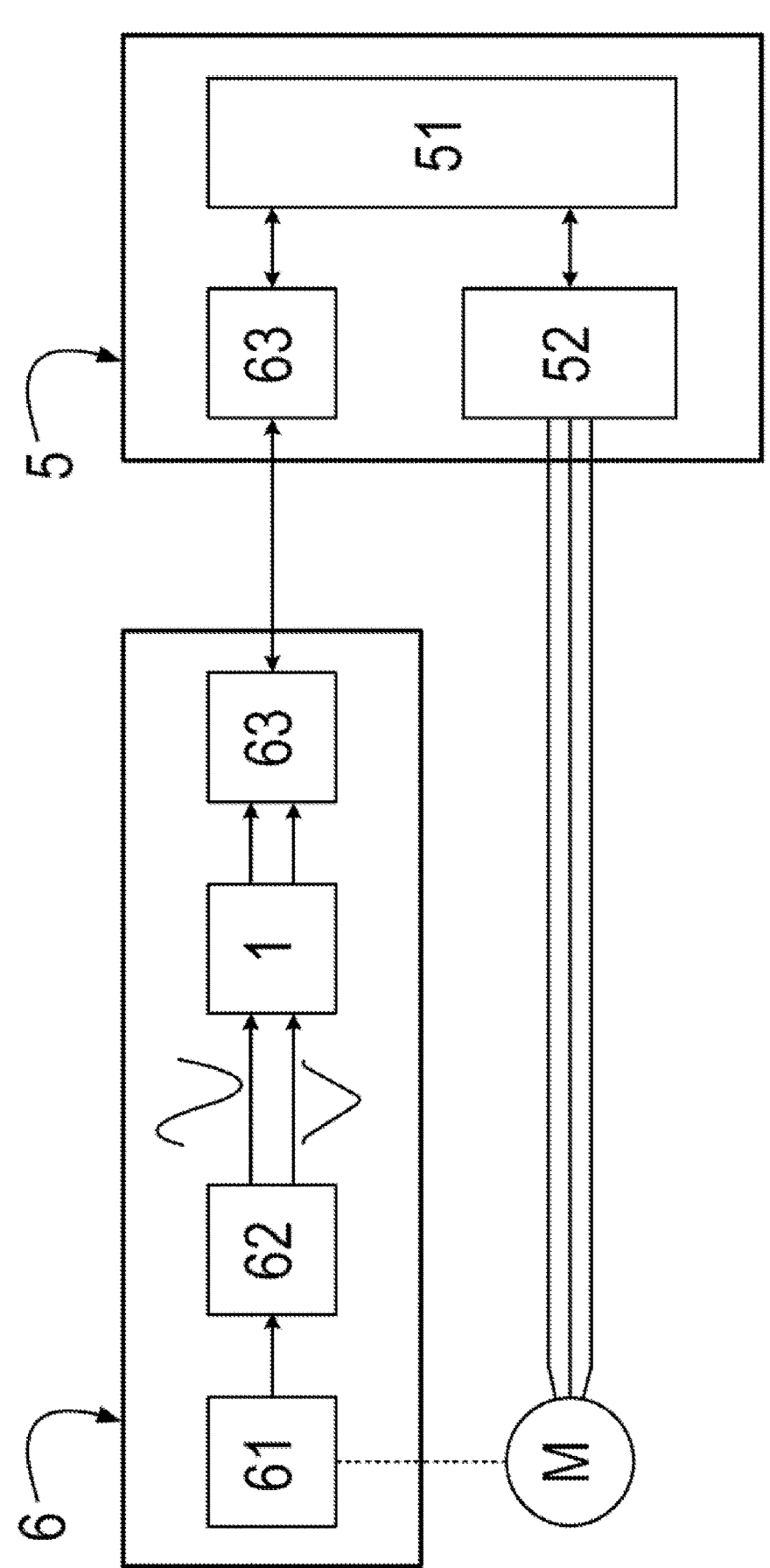
FIG. 5 schematically illustrates an implementation of an encoder signal diagnostic device.

A further example of an implementation of an encoder signal diagnostic device 1 according to an example embodiment of the present invention, in which the encoder signal diagnostic device 1 is constructed so as to be integrated in a position change sensor 6, is schematically illustrated in FIG. 5.

As illustrated in FIG. 1, the input signal of encoder signal diagnostic device 1 typically includes two signal tracks. In this context, the two signal tracks include a first signal track A and a second signal track B, second signal track B being 90° out of phase with respect to first signal track A. The two track signals form the input signals for both first evaluation unit 2 and further evaluation unit 3. From these track signals, first evaluation unit 2 computes, on the basis of digital signal parameters, at least one status information item, typically, a speed information item and/or a position information item and/or a direction of movement information item and/or an acceleration information item and/or a feedback information item, and makes this status information available at a first output of first evaluation unit 2. In addition, first evaluation unit 2 checks the digital signal parameters for plausibility and, in response to the detection of an error, sets an error signal at a further output of first evaluation unit 2. A further evaluation unit 3 evaluates the track signals of position change sensor 6 on the basis of analog signal parameters and, in response to the detection of an error, for example, due to departure from a range of validity of the track signal level, generates an error signal at the output of further evaluation unit 3. The error signals at both the output of first evaluation unit 2 and the output of further evaluation unit 3 are dynamic and are only applied for the duration of an occurring and detected error. In light of the status information item generated in first evaluation unit 2, logical operations unit 4 decides how the error signals of first evaluation unit 2 and of further evaluation unit 3 are logically combined with each other and generates, from this, a resulting error signal at its output. For example, both the status information item of first evaluation unit 2 and the resulting error signal of logic operations unit 4 are transmitted to the outputs of encoder signal diagnostic device 1. In this context, the resulting error signal indicates if the track signals of position change sensor 6 are erroneous.

An exemplary implementation of first evaluation unit 2, further evaluation unit 3 and logic operations unit 4 is illustrated in FIG. 2. In the first evaluation unit 2, the two track signals of position change sensor 6 are initially converted to square-wave signals by Schmitt trigger unit 21. These square-wave signals are supplied to both a quadrature decoder 22 and an edge counter 23. If the square-wave signal of signal track A leads signal track B in time, then a movement in one direction is taking place. If signal track A trails signal track B in time, then a movement in the opposite direction is taking place. Quadrature decoder 22 detects this direction of movement and, at each switching edge, adds or subtracts a numerical value, typically, a 1, to or from a first counter as a function of the detected, current direction of movement. At each switching edge of the square-wave signal of track A and/or of the square-wave signal of track B, edge counter 23 adds a value to a further counter independently of the direction of movement. Status information computation unit 24 computes a status information item from the movement-direction-dependent, first counter of quadrature decoder 22. Within a measuring cycle $T_{CYCLE}$, comparator unit 25 compares the magnitude of the change in the count of quadrature decoder 22 to the change in the count of edge counter 23. If the two changed values are unequal, then an error signal is generated at the output of comparator 25. Due to the differing computation methods in quadrature decoder 22 and edge counter 23, an inequality of the two changed values is always produced, if the direction of movement reverses inside of a measuring cycle $T_{CYCLE}$ and/or an error in the generation of a track signal in position change sensor 6 and/or an error in the transmission and/or processing of the track signals has occurred. In order to ensure that only the errors are detected, and not the permitted reversal of the direction of movement, the error signal of first evaluation unit 2 is only evaluated, if the status-information item lies above a certain limiting frequency $f_G$. Based on the inertia of the actuator, whose movement is reflected by track signals A and B, this limiting frequency ensures that no change in the direction of movement can have occurred within a measuring cycle $T_{CYCLE}$.

In further evaluation unit 3, track signal levels A and B are converted to synchronized pairs of values ($U_A$, $U_B$) by an analog-to-digital converter unit 31. The measuring times of the analog-to-digital conversion are specified by a timing generator unit 32, the measuring times being calculated as a function of numerical values from a lookup table unit 33. In this context, by storing different measuring times, lookup table unit 33 provides the flexibility of adapting further evaluation unit 3 to the specific needs of an application. In trigonometric unit 34, synchronized pairs of values ($U_A$, $U_B$) are evaluated via the Pythagorean trigonometric identity, using the relationship:

$$U_A^2 + U_B^2 = \left(\hat{U}_A * \sin(2\pi * f * t)\right)^2 + \left(\hat{U}_B * \cos(2\pi * f * t)\right)^2 = R^2.$$

If calculated value $R^2$ exits a predefined, typically constant range, then an error signal is generated at the output of trigonometric unit 34, the error signal also being transmitted to the output of further evaluation unit 3. In this connection, this predefined range may be adapted application-specifically and is typically specified by the manufacturer of position change sensor 6. Logic operations unit 4 combines the error signal of first evaluation unit 2 and the error signal of further evaluation unit 3. In this context, the error signal of first evaluation unit 2 is gated out via switch element 41, if the status information item is less than limiting frequency $f_G$ and therefore does not always supply a valid error signal (see further above). Logic unit 42 sets an error signal at the output, if an error signal is applied to either the output of switch element 41 or to the output of further evaluation unit 3. Thus, below a limiting frequency $f_G$, only the error signal of further evaluation unit 3, and above limiting frequency $f_G$, the error signals of both first evaluation unit 2 and further evaluation unit 3, are used for generating a resulting error signal.

Thus, as illustrated in FIG. 2, the output signal of position change sensor 6 is monitored, on one hand, with regard to deviation from a permissible value of the sum of the squares of the two track signals, and, on the other hand, for counter errors in accordance with the described function of first evaluation unit 2. In this context, the monitoring for deviation is only carried out at the times, which are specified according to lookup table unit 33, which means that gap-free, continuous monitoring is not present. However, since the monitoring for counter errors according to the described function of first evaluation unit 2 is also carried out simultaneously to this monitoring, sufficiently high reliability may be ensured. In particular, all relevant types of errors are covered.

The generation of measuring times according to example embodiments of the present invention, which are stored in lookup table unit 33 of further evaluation unit 3, and which are provided by timing generator unit 32 for synchronous analog-to-digital conversion of track signals A and B by analog-to-digital converter unit 31, is illustrated in FIG. 3. In this context, measuring interval $T_1$ is selected so that a track signal having a limiting frequency $f_G$ is sampled so often, that a number N, typically, a number of N 5, of measuring times sufficient for the needed diagnostic coverage is attained within a track signal period. In order to attain continuous sampling, a first set of measuring times is generated over entire measuring cycle $T_{CYCLE}$, using this measuring interval $T_1$. Simultaneously, a second set of measuring times is generated, by selecting a second measuring interval $T_2$ having half the length of measuring interval $T_1$ and adding a number K, typically, a quantity of 9, measuring times at the beginning of measuring cycle $T_{CYCLE}$. Each additional set of measuring times includes, in turn, of a number K of measuring times, which are added at the start of measuring cycle $T_{CYCLE}$; measuring interval $T_N$ always corresponding to half the length of preceding measuring interval $t_{N-1}$. The generation of further sets of measuring points is continued until at least a number N of measuring times lie within a track signal period of a track signal having a maximum frequency $f_{MAX}$. The number K of measuring times of a set of measuring times must be selected in such a manner, that over the entire frequency range to be covered by the specific set of measuring times, the respective measuring interval is at least 75% or at least 270° of the track signal period. The final set of measuring times $\Sigma T_M$ is yielded ultimately from the sum of all of the individual sets of measuring times; simultaneous measuring times being combined to form a common measuring time.

Thus, according to example embodiments of the present invention, the analog output signal of position change sensor 6 is sampled cyclically according to a sequence of sampling times. The sequence is finite and may also be referred to as a one-dimensional pattern. Therefore, according to this specified pattern, the sampling times are positioned temporally one after another.

As illustrated in FIG. 3, the pattern is used in a cyclically repeated manner. In this context, the temporal length of the pattern is $T_{CYCLE}$, which means that the pattern is used so as to be repeated with this period duration.

The pattern includes a plurality of directly consecutive time periods, in which, in each instance, a plurality of sampling times are positioned so as to be temporally set apart from each other at regular intervals. However, the spacing is different in each time period, that is, variable. In the first time period, a very short spacing is implemented, in the second time period, a greater spacing, etc. In this context, each time period subsequent to a time period has a greater spacing.

Referring to FIG. 3, the composition of the pattern as a sum of base patterns is explained in more detail. The first base pattern includes a regular spacing of sampling times having a time interval $T_1$. In this case, the spacing is selected in such a manner, that at the maximum permissible frequency, that is, frequency $f_{MAX}=1/T_{MAX}$, a period of the output signal is sampled five times. Thus, $T_{MAX}=5*T_1$.

Further base patterns are generated on the basis of the first base pattern. In this context, the spacing of a subsequent base pattern is calculated as a function of the spacing of the respective, preceding base pattern according to the formula $T_N=2*T_{N-1}$.

The number of base patterns generated results from a technically sensible reduction in the scanning times in comparison with the scanning at the highest possible frequency.

In the present case, 5 base patterns are generated.

The first base pattern having spacing $T_1$ extends over eight periods.

The second base pattern has a greater spacing, namely, $T_2=2*T_1$, and extends over eight periods.

The third base pattern has a greater spacing, namely, $T_3=2*T_2$, and extends over eight periods.

The fourth base pattern has a greater spacing, namely, $T_4=2*T_3$, and extends over eight periods.

The fifth base pattern has a greater spacing, namely, $T_5=2*T_4$, and extends temporally over time $T_{CYCLE}$.

This yields a lower limiting frequency $f_G=1/T_G$, where $T_G=5*T_5$, characterized in that an output signal having frequency $f_G$ is continuously scanned five times per period.

The base patterns generated are summed or superimposed. In this context, simultaneous sampling times of different base patterns are combined to form one sampling time in the sum of the base patterns.

Thus, the sum or superpositioning of the base patterns results in the pattern, which has, in the first time period, eight scanning times temporally set apart regularly from each other by $T_1$; has, in the following time period, four scanning times temporally set apart regularly from each other by $T_2$; has, in the time period following that, four scanning times temporally set apart regularly from each other by 13; has, in the time period following that, four scanning times temporally set apart regularly from each other by $T_4$; and has, in the time period following that, scanning times temporally spaced apart regularly from each other by $T_5$.

In this manner, it is ensured that at least once per $T_{CYCLE}$, a period of the output signal is sampled at least five times, as long as its frequency is in the permissible range between $f_G$ and $f_{MAX}$. The periods of output signals having a frequency lower than $f_G$ are always sampled at least five times over a plurality of $T_{CYCLE}$'s.

An advantage of this is that computing time may be reduced, since sampling at the highest possible frequency is not carried out over the entire interval $T_{CYCLE}$. However, gap-free, continuous monitoring, thus, diagnosis as well, would not be able to be ensured, if the sampling represented in FIG. 3 were used; but this gap in monitoring is reduced by digital monitoring carried out simultaneously.

A first exemplary implementation of an encoder signal diagnostic device 1 according to an example embodiment of the present invention, which is integrated in a frequency converter 5 of an electric power drive system, is illustrated in FIG. 4. In this context, the external position change sensor 6 connected to frequency converter 5 in an electrically conductive manner is typically mounted to the shaft of an electric motor M; position change sensor 6 converting the angular motion to track signals A and B via a mechanical adapter 61 and with the aid of an analog signal recorder 62; for their part, the track signals being 90° out of phase and constituting the input track signals for encoder signal diagnostic device 1. The output signals of encoder signal diagnostic device 1, the status information item of first evaluation unit 2 and the resulting error signal of logic operations unit 4, are supplied to the regulating portion of signal electronics 51 of frequency converter 5. Regulating portion 51 uses the status information item for regulating and controlling electric motor M, and the resulting error signal is used as information as to whether the status information item is valid and may be used for regulation. In the event of an invalid status information item, the driving of electric motor M is immediately interrupted, so that a dangerous movement, which may cause damage to the system and/or cause injury to persons, does not take place. Consequently, only with a valid status information item, is it possible to set electric motor M into motion application-specifically via power electronics 52.

A second exemplary implementation of an encoder signal diagnostic device 1 according to an example embodiment of the present invention, which is constructed so as to be integrated in a position change sensor 6, is illustrated in FIG. 5. In contrast to FIG. 4, in this case, the signal input of encoder signal diagnostic device 1 is connected directly to analog signal recorder 62 of position change sensor 6 in an electrically conductive manner. The output signals of encoder signal diagnostic device 1 are adapted to the protocol of a serial communications interface via a converter (63); the serial communications interface being connected to both position change sensor 6 and frequency converter 5. Using a further converter 63 in frequency converter 5, both the status information item and the resulting error signal of encoder signal diagnostic device 1 are provided cyclically to the regulating portion of control electronics 51 of frequency converter 5 in digitized form. In this manner, errors in the transmission between position change sensor 6 and frequency converter 5 may additionally be reduced.

Thus, example embodiments of the present invention relate to resource-optimized diagnosis of errors of track signals of a position change sensor. This object is achieved by carrying out the diagnostic evaluation in a manner adapted to a maximum occurring track signal frequency, using both digital signal parameters and analog signal parameters; by suitably combining the two types of signal parameters, the number of measuring times needed being able to be reduced in such a manner, that consequently, costs, in particular, component and/or manufacturing costs, may be reduced.

As noted above, the electrical signals of the position change sensor 6 may be generated by an optical or magnetic method, in that two sensors 65, 66 are positioned so that a scale 67 that includes alternating bright and dark spots 68, 69, or changing magnetic flux densities, is scanned in such a manner, that the one sensor 65 always measures an extremum, while at the same time, the other sensor 66 detects the zero crossing. This produces two continuous, sinusoidal signals, the analog track signals A and B, which are 90° out of phase.

The following list of reference characters is included in the description and clarifies further features hereof.

LIST OF REFERENCE CHARACTERS

1 encoder signal diagnostic device
2 first evaluation unit; digital signal parameter evaluation
21 Schmitt trigger unit
22 quadrature decoder
23 edge counter
24 status information computation unit
25 comparator unit
3 further evaluation unit; analog signal parameter evaluation
31 analog-to-digital converter unit
32 timing generator unit
33 lookup table unit
34 trigonometric unit
4 logic operations unit
41 switch element
42 logic unit
5 frequency converter
51 regulating portion of the signal electronics
52 power electronics for operating an electric motor
6 position change sensor
61 mechanical adapter
62 analog signal recorder
63 converter to the protocol of a serial communications interface
M electric motor
f signal frequency
$f_G$ limiting signal frequency
$f_{MAX}$ maximum signal frequency
t time
$T_1$ first test interval
$T_n$ nth or current test interval
$T_{n-1}$ preceding test interval
$\Sigma T_M$ sum of the measuring times
$T_{CYCLE}$ measuring cycle
N number of measuring times needed per signal period for sufficient diagnostic coverage
K number of measuring times needed for a set of measuring times
$U_A$ signal level of track signal A
$U_B$ signal level of the track signal B 90° out of phase with respect to track signal A
$\hat{U}_A$ amplitude of track signal A
$\hat{U}_B$ amplitude of track signal B

What is claimed is:

1. A device, comprising:
a position change sensor including:
a scale including alternating bright and dark spots; and
a first optical sensor and a second optical sensor, the scale being movable relative to the first optical sensor and the second optical sensor, the first optical sensor and the second optical sensor adapted to optically scan the scale, the first optical sensor adapted to generate a first track signal in response to the optical scanning of the scale, the second optical sensor adapted to generate a second track signal in response to the optical scanning of the scale, the track signals being continuous, sinusoidal analog electrical signals and being 90° out of phase with respect to each other, the position change sensor adapted to measure changes in position or angle of the scale relative to the first optical sensor and the second optical sensor;

a first evaluation unit;

a further evaluation unit; and a logic operations unit;

wherein the first evaluation unit is adapted to evaluate the track signals based on digital signal parameters;

wherein the first evaluation unit is adapted to compute, and to make available at a first output of the first evaluation unit, a status information item from the digital signal parameters;

wherein the first evaluation unit is adapted to generate an error signal at a further output of the first evaluation unit in response to detection of an error condition of the digital signal parameters;

wherein the further evaluation unit is adapted to evaluate the track signals based on analog signal parameters;

wherein the further evaluation unit is adapted to generate an error signal at an output of the further evaluation unit in response to departure from a valid range of the analog signal parameters;

wherein the logic operations unit is adapted to generate, by performing a logic operation, a resulting error signal at an output of the logic operations unit as a function of the status information item, a state of the error signal of the first evaluation unit, and a state of the error signal of the further evaluation unit; and wherein the logic operations unit is adapted to transmit the resulting error signal to a first output of the device;

wherein the first evaluation unit includes a Schmitt trigger unit, a quadrature decoder, an edge counter, a status information computation unit, and a comparator unit;

wherein the Schmitt trigger unit is adapted to convert the track signals of the position change sensor to square-wave signals;

wherein the quadrature decoder is adapted to generate a direction-dependent edge count value from the square-wave signals;

wherein the edge counter is adapted to generate a direction-independent edge count value from the square-wave signals;

the status information computation unit is adapted to compute a status information item from the direction-dependent edge count value and to make the status information item available at a first output of the first evaluation unit; and wherein the comparator unit is adapted to check, within a measuring cycle, a magnitude of change in the direction-dependent edge count value and a change in the direction-independent edge count value for equality and to set, in the event of inequality, an error signal at a further output of the first evaluation unit.

2. The device according to claim 1, wherein the digital signal parameters include trailing and/or leading switching edges and/or the analog signal parameters include voltage levels and/or current levels.

3. The device according to claim 1, wherein the resulting error signal indicates whether the track signals of the position change sensor are erroneous.

4. The device according to claim 1, wherein the first evaluation unit is adapted to transmit the status information item to a further output of the device.

5. The device according to claim 1, wherein the logic operations unit includes a switch element and a logic unit;

wherein the switch element is adapted to transmit or not transmit an error signal of the first evaluation unit to an output as a function of the status information item of the first evaluation unit; and the logic unit is adapted to set an error signal at an output of the logic operations unit, as soon as the error signal of the first evaluation unit transmitted by the switch element and/or the error signal of the further evaluation unit is applied.

6. The device according to claim 1, further comprising a frequency converter and a position change sensor;

wherein the evaluation units and the logic operations unit are integrated in the frequency converter;

wherein the position change sensor includes an analog output stage; and wherein, on an output side, the first evaluation unit is connected to a regulating portion of signal electronics of the frequency converter.

7. The device according to claim 6, wherein the evaluation units and the logic operations unit are integrated in the position change sensor;

wherein, on an input side, the evaluation units are connectable to an analog output stage of the position change sensor;

wherein the analog output stage of the position change sensor is adapted to generate and/or condition analog track signals;

wherein, on an output side, the first evaluation unit and/or the logic operations unit are connectable to a converter to a serial communications interface;

wherein the position change sensor is connectable to a frequency converter via a serial communications interface; and wherein, via the serial communications interface, at least the track signals and/or the status information item of the output of the first evaluation unit and the resulting error signal of the output of the logic operations unit are transmittable by a further converter to the regulating portion of the signal electronics of the frequency converter.

8. The device according to claim 1, wherein the device is adapted to perform a method that includes:

cyclically sampling the track signals of the position change sensor using a chronological sequence; and evaluating sampling values obtained in the sampling step;

wherein the sequence includes time periods, each time period including more than four sampling times set apart temporally from each other at regular intervals, and each time period corresponding to a respective temporal spacing.

9. The device according to claim 1, wherein the status information item includes a speed information item, a position information item, a direction of movement information item, an acceleration information item, and/or a feedback information item.

10. The device according to claim 1, wherein the position change sensor is arranged as a linear encoder.

11. The device according to claim 1, wherein the position change sensor is arranged as an angular encoder.

12. A method for monitoring track signals of a position change sensor by the device recited in claim 1, comprising:

cyclically sampling the track signals of the position change sensor using a chronological sequence; and evaluating sampling values obtained in the sampling step;

wherein the sequence includes time periods, each time period including more than four sampling times set apart temporally from each other at regular intervals, and each time period corresponding to a respective temporal spacing.

13. The method according to claim 12, wherein the method is performed with the aid of an encoder signal diagnostic device.

14. The method according to claim 12, wherein the sequence includes a succession of sampling times.

15. The method according to claim 12, wherein each time period is uniquely corresponds to a respective spacing.

16. The method according to claim 12, wherein the temporal spacing corresponding to a first one of the time periods is less than the temporal spacing corresponding to a second one of the time periods occurring later within the sequence.

17. The method according to claim 16, wherein the temporal spacing corresponding to a time period of the sequence directly following a preceding time period of the sequence is twice as large as the temporal spacing corresponding to the preceding time period.

18. The method according to claim 12, wherein the spacing corresponding to a temporally-first time period of the sequence corresponds to a fifth of a period length of a maximum permissible frequency of output signals of the position change sensor or less, and/or the spacing corresponding to a temporally-last time period of the sequence corresponds to a fifth of a period length of a limiting signal frequency or less.

19. The method according to claim 12, further comprising further evaluating the track signals based on digital signal parameters and combining the result of the evaluating and the further evaluating to completely diagnose for errors the track signals up to a maximum signal frequency.

20. The method according to claim 19, wherein the digital signal parameters include trailing and/or leading switching edges.

21. The method according to claim 12, wherein the sequence is generated in advance and/or during production or initial operation, and are stored in a lookup table unit.

22. A device for diagnosing errors of track signals of a position change sensor and/or of an incremental encoder, comprising:

a first evaluation unit;
a further evaluation unit; and
a logic operations unit;
wherein the first evaluation unit is adapted to evaluate the track signals based on digital signal parameters;
wherein the first evaluation unit is adapted to compute, and to make available at a first output of the first evaluation unit, a status information item from the digital signal parameters;
wherein the first evaluation unit is adapted to generate an error signal at a further output of the first evaluation unit in response to detection of an error condition of the digital signal parameters;
wherein the further evaluation unit is adapted to evaluate the track signals based on analog signal parameters;
wherein the further evaluation unit is adapted to generate an error signal at an output of the further evaluation unit in response to departure from a valid range of the analog signal parameters;
wherein the logic operations unit is adapted to generate, by performing a logic operation, a resulting error signal at an output of the logic operations unit as a function of the status information item, a state of the error signal of the first evaluation unit, and a state of the error signal of the further evaluation unit;

wherein the logic operations unit is adapted to transmit the resulting error signal to a first output of the device;
wherein the first evaluation unit includes a Schmitt trigger unit, a quadrature decoder, an edge counter, a status information computation unit, and a comparator unit;
wherein the Schmitt trigger unit is adapted to convert the track signals of the position change sensor to square-wave signals;
wherein the quadrature decoder is adapted to generate a direction-dependent edge count value from the square-wave signals;
wherein the edge counter is adapted to generate a direction-independent edge count value from the square-wave signals;
the status information computation unit is adapted to compute a status information item from the direction-dependent edge count value and to make the status information item available at a first output of the first evaluation unit; and
wherein the comparator unit is adapted to check, within a measuring cycle, a magnitude of change in the direction-dependent edge count value and a change in the direction-independent edge count value for equality and to set, in the event of inequality, an error signal at a further output of the first evaluation unit.

23. A device for diagnosing errors of track signals of a position change sensor and/or of an incremental encoder, comprising:

a first evaluation unit;
a further evaluation unit; and
a logic operations unit;
wherein the first evaluation unit is adapted to evaluate the track signals based on digital signal parameters;
wherein the first evaluation unit is adapted to compute, and to make available at a first output of the first evaluation unit, a status information item from the digital signal parameters;
wherein the first evaluation unit is adapted to generate an error signal at a further output of the first evaluation unit in response to detection of an error condition of the digital signal parameters;
wherein the further evaluation unit is adapted to evaluate the track signals based on analog signal parameters;
wherein the further evaluation unit is adapted to generate an error signal at an output of the further evaluation unit in response to departure from a valid range of the analog signal parameters;
wherein the logic operations unit is adapted to generate, by performing a logic operation, a resulting error signal at an output of the logic operations unit as a function of the status information item, a state of the error signal of the first evaluation unit, and a state of the error signal of the further evaluation unit;
wherein the logic operations unit is adapted to transmit the resulting error signal to a first output of the device;
wherein the further evaluation unit includes a timing generator unit, a lookup table unit, an analog-to-digital converter unit, and a trigonometric unit;
wherein the timing generator unit is adapted to generate synchronization signals cyclically in variable intervals, as a function of data from a lookup table unit;
wherein the analog-to-digital converter unit is adapted to convert a current analog level of the track signals of the position change sensor to corresponding digital pairs of values (UA, UB) as a function of the synchronization signal; and wherein the trigonometric unit is adapted to check the digital pairs of values of the track signals for validity, using the equation:

5

$$U_A^2 + U_B^2 = \left( \hat{U}_A * \sin(2\pi * f * t) \right)^2 + \left( \hat{U}_B * \cos(2\pi * f * t) \right)^2 = R^2,$$

and, upon departure from a defined tolerance range of values, to set an error signal at an output of the further 10 evaluation unit.

\* \* \* \* \*